March 15, 1949. F. AHLBURG ET AL 2,464,545
BAG FILLING MACHINE
Filed Feb. 24, 1947 3 Sheets-Sheet 3
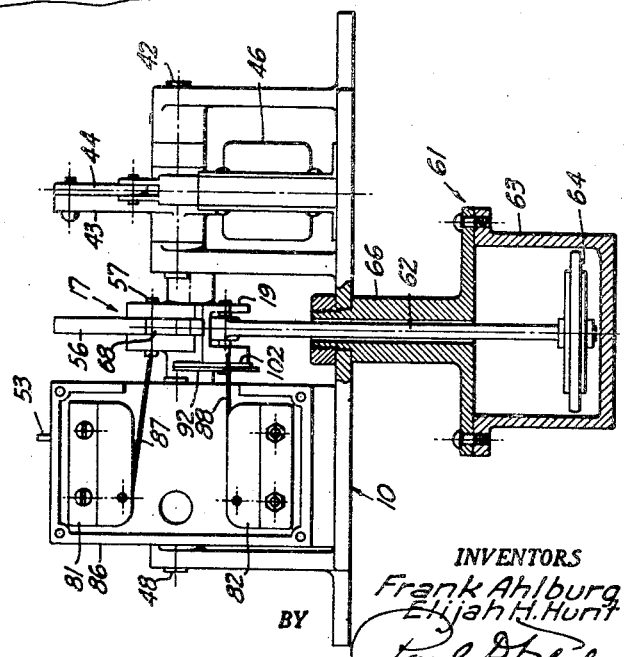
INVENTORS
Frank Ahlburg
Elijah H. Hunt
BY
ATTORNEY Patented Mar. 15, 1949

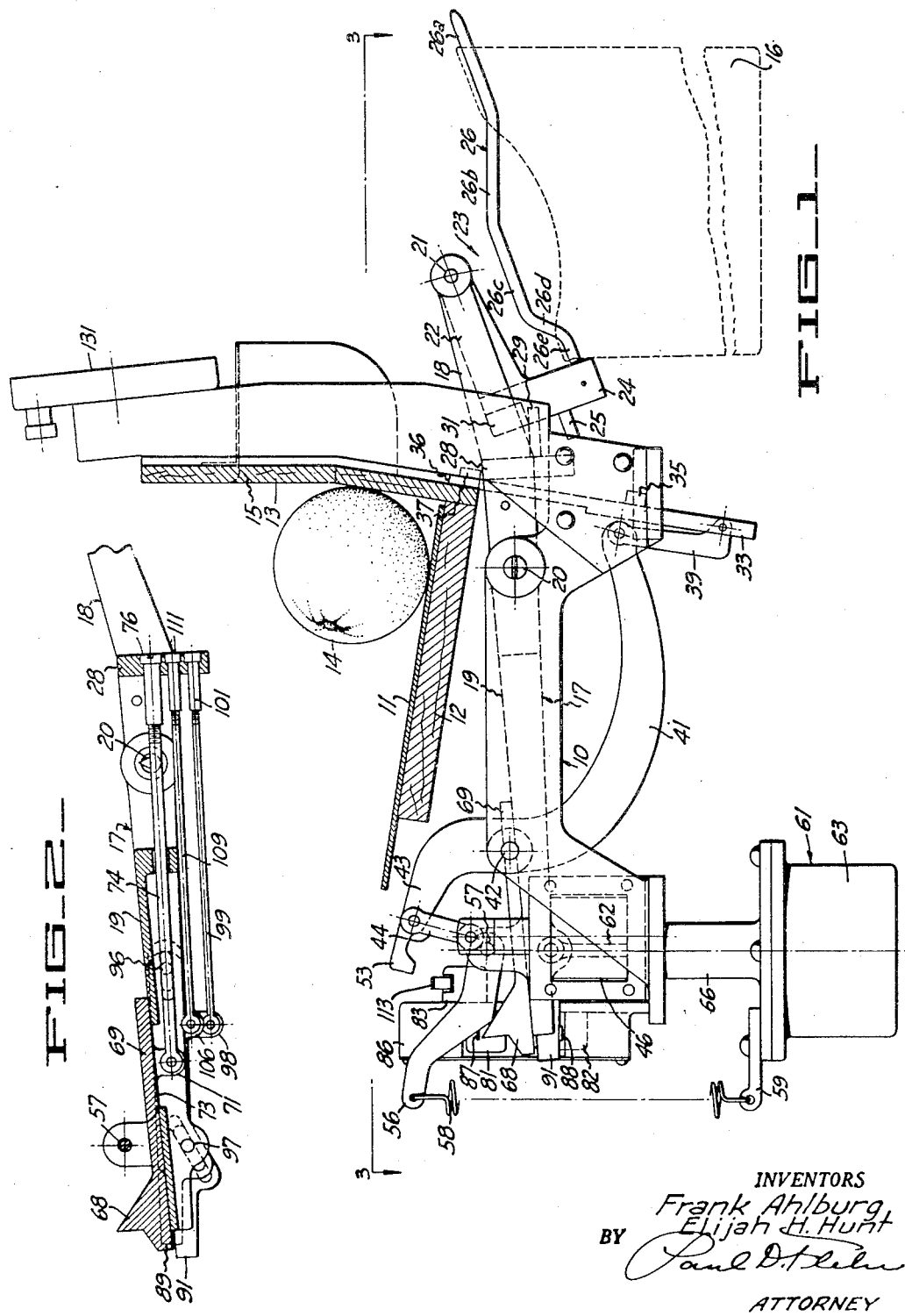

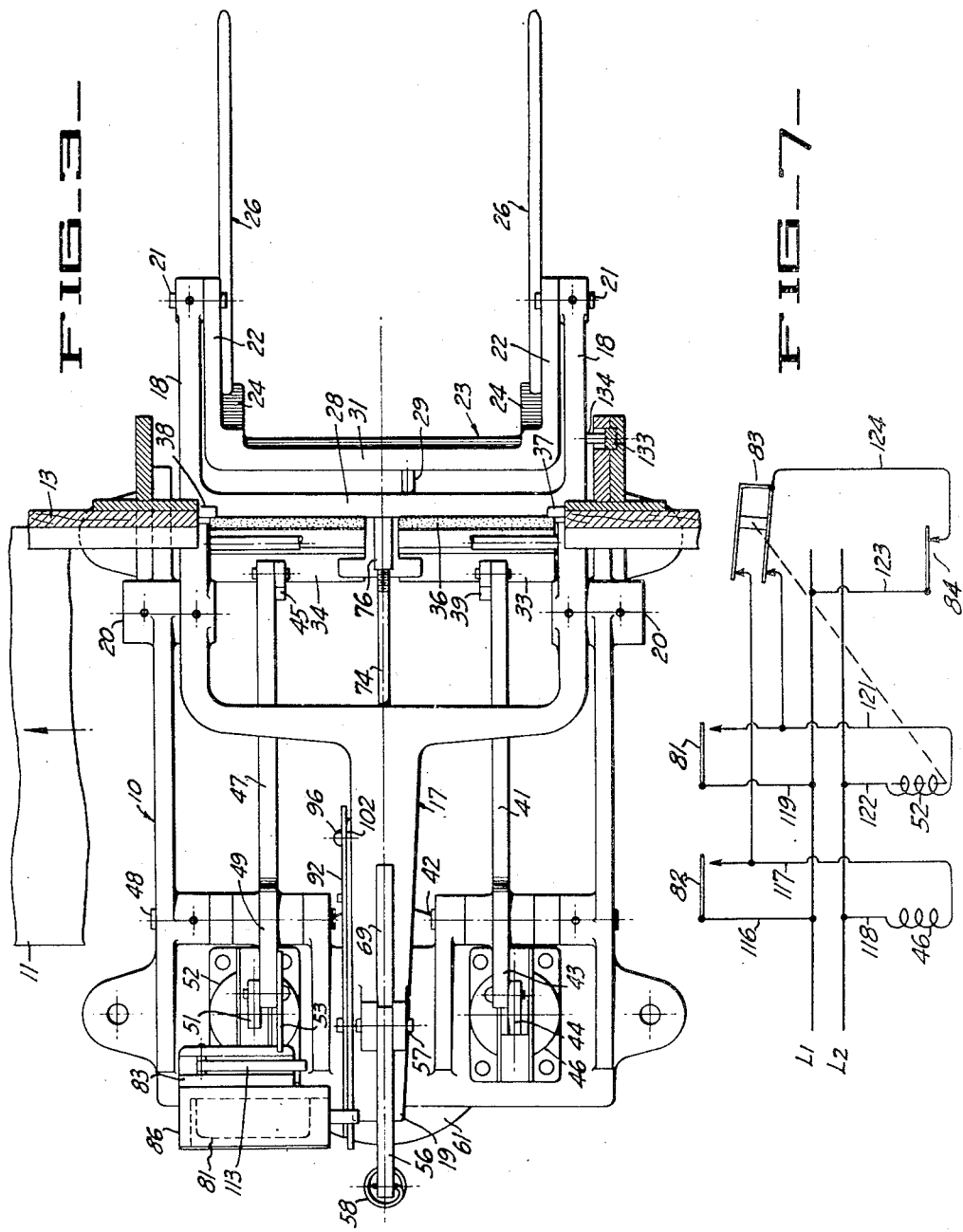

2,464,545

UNITED STATES PATENT OFFICE 2,464,545

BAG FILLING MACHINE

Frank Ahlburg, Los Angeles, and Elijah H. Hunt, Huntington Park, Calif.; said Ahlburg assignor to Desda Ahlburg and said Hunt assignor to Mark F. Jones, both of Los Angeles, Calif.

Application February 24, 1947, Serial No. 730,502

3 Claims. (Cl. 249—61)

This invention relates generally to apparatus for handling and automatically weighing predetermined amounts of articles such as citrus fruit, apples, potatoes and the like. More particularly it relates to apparatus capable of weighing out a predetermined amount of such articles and depositing the same directly into receiving means in which the articles are to be marketed, as for example bags made of netting.

A considerable amount of produce such as citrus fruit, apples or potatoes is marketed in bags made of cotton netting. Each bag must be of a given weight within certain tolerance limits, which necessitates a weighing operation in conjunction with filling the bags. Application of automatic weighing machines to this problem is complicated by the fact that each article of fruit possesses considerable weight, whereby two or three articles of fruit more or less than required for the weight desired, will exceed the permissible tolerances or in other words will provide too much underweight or overage.

It is an object of the present invention to provide an automatic weighing machine which affords a practical solution to the above problem, and which in particular is adapted to the handling and weighing of such articles as citrus fruit, apples or potatoes.

It is a further object of the invention to provide a machine of the above character which serves to prevent too much underweight or overage, and which in general will limit the underweight or overage to an amount which is not in excess of the weight of one article.

Another object of the invention is to provide a machine of the above character which can be readily operated and which serves to automatically weigh in conjunction with filling of a bag.

Additional objects of the invention will appear from the following description in which the preferred embodiment of the invention has been set forth in detail in conjunction with the accompanying drawing.

Referring to the drawing:

Figure 1 is a side elevational view in section illustrating a machine incorporating the present invention.

Figure 2 is a cross-sectional detail illustrating adjustable means for the switch operating mechanism.

Figure 3 is a plan section view taken along the line 3—3 of Figure 1.

Figure 4 is a front view of the machine looking toward the right hand end of the machine as illustrated in Figure 1.

Figure 5 is a detail partly in section illustrating certain of the electrical switches, and the dash pot for the weighing beam.

Figure 6 is an enlarged detail illustrating the adjustable members for operating certain of the electrical switches.

Figure 7 is a circuit diagram illustrating the manner in which the various switches and solenoids are connected.

The machine as illustrated in the drawings consists generally of a frame 10 which is normally mounted upon suitable support means (not shown). Suitable conveying means such as one run of an endless belt 11 extends laterally across the frame 10, and is supported by suitable means such as the wall 12. Along one side of the conveyor 11 there is an upright stationary guide wall 13, and both the wall 12 and belt 11 are tilted (Figure 1) whereby articles (such as oranges 14) being moved by the conveyor normally crowd toward the guide wall 13. Guide wall 13 is provided with an opening 15 (Figure 4) through which articles may pass, to drop by gravity into the bag 16 or other article receiving means provided.

Below the conveyor there is a weighing beam 17 consisting of two laterally spaced forwardly extending arms 18, and a rearwardly extending arm 19. Arms 18 have fulcrum connections 20 with the frame 10, whereby the beam extends generally horizontal and may rock about a horizontal axis.

The forward ends of the beam arms 18 have pivotal connections 21 with the arms 22 of a bag hanger 23. The hanger is provided with depending lug-like extensions 24 which serve as mountings for the bag engaging prongs 26. Lugs 24 carry stop pins 25 adapted to engage the crossbar 28 of the weighing beam, thereby limiting the extent of oscillation in a clockwise direction as viewed in Figure 1. Crossbar 28 is also provided with a stop pin 29 which is adapted to engage the crossbar 31 of the hanger 23, thus limiting oscillating movement of the hanger in a counterclockwise direction.

Prongs 26 are formed in such a manner as to facilitate threading of the same upon the upper edge of a net bag, and to retain the bag properly located with respect to the axis of the pivotal connections 21. Thus each of the prongs is bent as illustrated in Figure 1, to provide the portions 26a, 26b, 26c, 26d and 26e. In general portion 26c is offset upwardly with respect to the forward portions 26a and the rearmost portions 26e. When the upper edge of a net bag is threaded upon a prong substantially as illustrated in Figure 1, a portion of the bag is brought definitely into abutment with the lug 24, whereby such portion of the bag is suspended from the prong portion 26e. When suspended in this manner articles may be dropped into the bag and hanger 23 may oscillate about the axis of pivotal connections 21, without material displacement of the bag with respect to its vertical axis, and with the weight of the bag being applied along a line spaced from the axis of the beam fulcrum 20 by a predetermined amount corresponding to the lateral distance between such axis and the axis of pivotal connections 21.

In order to control passage of articles through the opening 15 in a predetermined manner, we have provided a pair of slidable gates or barriers 33 and 34. These members are in the form of metal plates having their upper edges 36 faced with rubber or like resilient material. Their vertical edges engage within the grooved guides 37 and 38, which are carried by the frame 10. Each gate is movable between two limiting positions, one being a lower or retracted position (see Figure 1) in which the upper edge of the same does not interfere with passage of articles through the opening 15, and the second being a raised position in which its upper edge serves to block movement of articles through the opening 15, and to thus retain the articles upon the conveyor belt 11. Where oranges are being handled the raised position may for example be at a height of the order of one inch above the conveyor. Each gate is shown provided with a stop-lug 35 to limit the lower position of the same.

Electrical operating means is provided for each of the gates 33, 34. Thus gate 33 is pivotally attached to a link 39 (Figure 1) which in turn pivotally connects to one end of the lever 41. Lever 41 is fulcrumed at 42 to the frame 10, and its rear end 43 is connected by link 44 with the operating member of an electrical solenoid 46 (Figure 5). The other gate 34 is similarly connected to link 45, which connects to lever 47. This lever is fulcrumed at 48 and its rear extension 49 is connected by link 51 to the operating member of solenoid 52. Lever extension 49 also carries a switch operating finger 53 to be presently described.

In order to properly counterbalance the weighing beam 17, an arm 56 is pivoted at 57 to the rear arm 19 of the beam, and this arm is attached to the tension spring 58, the other end of which is anchored at 59 to the frame of the machine.

Suitable dash pot means 61 is provided to prevent rapid movement of the weighing beam. The arrangement illustrated consists of a rod 62 having its upper end pivoted to the arm 19 of the beam, and its other end extending downwardly into the dash pot chamber 63 (Figure 5). This chamber accommodates the plunger 64 which is attached to the lower end of rod 62, and operates in a suitable damping fluid such as oil, which is maintained within the chamber. The dash pot chamber is attached by extension 66 to the frame of the machine.

Means is provided to enable an adjustment of the counterbalancing spring from the front of the machine. Thus arm 56 is engaged by the triangular cam plate 68 (Figure 1), which in turn is mounted upon the rear end of a bar 69 (Figure 2). This bar is slidably mounted upon the beam arm 19, and has a depending lug 71 extending through the slot 72. Lug 71 is attached to the rod 74, the forward end of which is threaded and engaged by the adjusting nut 76. Nut 76 is seated in the beam crossbars 28, and can be engaged by a screwdriver or like tool to adjust the same. It will be evident that by turning nut 76, rod 74 is adjusted longitudinally to correspondingly adjust the cam plate 68. Thus the angular setting of arm 56 with respect to the weighing beam is adjusted to effectively change the tension of the counterbalancing spring 58.

A suitable electrical circuit serves to energize the solenoids 46 and 52 in such a manner that the gates 33 and 34 are operated in sequential order, during a weighing operation. In other words during the initial part of a bag filling cycle, both gates are in their lowered positions whereby two or more articles may pass through the opening 15 substantially simultaneously. Toward the end of the weighing cycle however, solenoid 46 is energized to raise the gate 33, thus blocking passage of articles through the left hand portion of opening 15 as viewed in Figure 4, and permitting articles to pass one by one through the right hand portion of the opening, until the desired weight has been obtained or approximated. Then the second solenoid 52 is energized to raise the second gate 34. Thereafter both solenoids remain energized to prevent delivery of additional articles until after the operator has removed the filled bag, and has recycled the machine. The contacting means included in this electrical circuit includes the switches 81 and 82, together with a holding switch 83 (Figure 3) and recycling switch 84 (Figure 4).

Switches 81 and 82 can be of the microswitch type, and are shown carried within the mounting box 86 at the rear end of the machine (Figure 5). The switches have operating fingers 87 and 88 which are adapted to be operated by the fingers 89 and 91 (Figure 6), which are adjustably carried by the arm 19 of the weighing beam. The adjusting means illustrated is convenient and desirable in that it can be readily operated from the front of the machine. Thus finger 89 is formed as an end portion of a plate 92, and is provided with generally horizontally and inclined slots 93 and 94. Retention pins 96 and 97 are attached to the adjacent arm 19 of the weighing beam, and are loosely accommodated within slots 93 and 94 whereby lengthwise adjustment of plate 92 causes the end finger 89 to be raised or lowered. A lug 98 on plate 92 is engaged by rod 99 (Figure 2), the forward end of which is threaded and engaged by the adjusting nut 101. Finger 91 is similarly formed as the end of a plate 102, and this plate likewise is provided with horizontal and inclined slots 103 and 104 which accommodate the same retention pins 96 and 97. Plate 102 likewise is provided with a lug 106 attached to the rear end of an adjusting rod 109. The forward end of rod 109 is threaded and engaged by nut 111. It will be evident that by turning nuts 101 and 111 by a screwdriver or like suitable tool the fingers 89 and 91 can be raised or lowered relative to the weighing beam, to desired switch operating positions. In general finger 89 is adjusted whereby when a desired fractional part of the complete weight has been delivered to the bag, switch finger 87 is engaged and moved to effect operation of the switch 81. Finger 91 is adjusted whereby when the beam is substantially balanced, switch finger 88 has been moved a sufficient distance to operate the contacts of switch 82.

Holding switch 83 is adapted to be operated by finger 53, which as previously described is mounted upon the solenoid operating lever 47. Thus when member 47 is swung under the urge of solenoid 52, the finger engages and operates the switch operating finger 113.

Figure 7 illustrates suitable circuit connections for the two solenoids and the various switches. Switches 81 and 82 have simple sets of contacts as illustrated, and switch 83 has a double set of contacts. Switch 82 and solenoid 46 are connected in series with current supply lines L1 and L2, by conductors 116, 117 and 118. Switch 81 and solenoid 52 are similarly connected to the current supply lines by conductors 119, 121 and 122. The two stationary contacts of switch 83 are connected respectively to the conductors 117 and 121, and the arms of this switch are connected in series with switch 84, by conductors 124 and 123, the latter connecting with current supply line L1.

Switch 82 is of such a type that when its operating finger 88 is permitted to elevate a given amount (under the urge of spring tension provided within the switch) its contacts close with snap action. Switch 81 is of such a type that when its operating finger 87 is moved upwardly a given amount (Figure 5) its contacts are closed by snap action. The contacts of switch 83 are closed with snap action by operation of its operating finger 113, when engaged by finger 53. The contacts of switch 84 are normally closed but are momentarily opened with snap action when the operating member of this switch is depressed manually. As manual pressure is released the contacts automatically close.

Assuming that the contacts of switches 81, 82 and 83 are initially open, operation of the circuit during a weighing cycle is as follows: When a given amount of articles have dropped into the bag the beam rocks a sufficient amount against the tension of the counterbalancing spring to close switch 82, whereby the solenoid 46 is energized. Thereafter articles continue to fall one by one into the bag until the beam is substantially completely balanced, at which time switch 81 is closed to energize the solenoid 52. Energizing of this solenoid not only operates its corresponding gate 34, but in addition switch 83 is operated to close its contacts. Closing of switch 83 short circuits both switches 81 and 82 whereby solenoids 46 and 52 continue to be energized irrespective of possible opening of switches 81 or 82. When the operator desires to commence a new operating cycle, switch 84 is momentarily depressed, thus interrupting the holding circuit and permitting all parts to return to their initial positions, whereby switches 81, 82 and 83 are opened.

As previously explained when the gate 33 is elevated, the remaining portion of opening 15 through which the articles may drop, should be sufficiently small in dimensions that the articles can pass only one after the other. To enable adjustment of the machine whereby such operation can be obtained for various sized articles, we have shown a small supplemental barrier 126 which is adjustably mounted upon the side wall 13. For the smaller size articles this supplemental barrier is adjusted to a position where it blocks off a substantial amount of the opening left after gate 34 has been elevated. For the larger size articles it can be adjusted to retracted position.

It is desirable to provide a visual indicator 131 which can be readily observed by the operator from the front of the machine. This indicator can be a simple graduated dial in conjunction with a rotary pointer 132. A connection is made between the pointer and the weighing beam whereby the pointer will indicate a condition of balance. This connection can consist for example of a vertically extending bar 133 slidably carried by the frame, which has its lower end pivotally connected by pin 134 to the adjacent portion of the weighing beam, and its upper portion provided with a gear rack. A rotatable pinion is attached to the pointer 132 and engages the gear rack.

Operation of the machine as a whole will be evident from the foregoing. Assuming that the conveyor is in operation and that suitable means is provided to supply an ample quantity of articles (such as oranges) to the conveyor, the articles are moved along the guide wall 13 and tend to crowd against this wall because of the tilted conveyor. Assuming that an operator has placed a bag upon the hanger 23 in a manner previously described, the switches 81, 82 and 83 are opened, and the gates 33, 34 are in their lower retracted positions whereby the articles may pass freely through the opening 15 to drop into the bag. When a major part of the total weight desired has thus dropped into the bag, the weighing beam rocks upon its fulcrum sufficiently far to close the switch 81 and thereby operate solenoid 46 and elevate the corresponding gate 33. This serves to block oranges from passing through the left hand portion of opening 15 (Figure 4) whereby the oranges must now pass one after the other through the remaining right hand portion of the opening. When the number of oranges thus introduced one at a time brings the weight up to the predetermined value desired, the weighing beam causes closing of contact 82, thus operating solenoid 52 and raising the second gate 34. This serves to block all further introduction of oranges into the bag. As previously explained, operation of solenoid 52 serves to close the holding switch 83, whereby thereafter the solenoids are energized irrespective of movement of the weighing beam when the operator removes the filled bag. After a new bag has been applied the operator presses the recycling switch 84 and as previously described this opens the holding circuit and de-energizes solenoids 46 and 52 to permit the gates 33 and 34 to drop down to their lower positions.

It will be evident from the foregoing that our machine possesses many desirable features. The weigh provided is relatively accurate because during the final portion of the weigh the articles are dropped by one into the bag. Therefore the overweight is never more than the weight of one article, and on the average it will be of a fraction of such weight. The machine is relatively simple to manipulate by an operator, due to the automatic cycle involved, and the operator has no difficulty in applying empty bags to the machine, or in removing the filled bags. By means which has been previously described it is a simple matter to reset the machine for different predetermined weights, and for the handling of articles of a different average size.

We claim:

1. In a filling and weighing machine for handling articles such as citrus fruit, apples, potatoes and the like, a pivoted weighing beam, means for supporting an article receiving means from one end portion of the beam, means for conveying said articles along a predetermined path, article guide means along one side of said path formed to provide an opening through which the articles may pass to drop into said receiving means, a pair of side-by-side gates each movable from an article passing position to an article blocking position within said opening, and means controlled by the movements of said beam for separately and successively actuating said gates to move the same to said article blocking positions as the beam is brought to a position of balance, the time interval between the successive actuations being sufficient to allow at least one article to pass through said opening.

2. In a filling and weighing machine for handling articles such as citrus fruit, apples, potatoes and the like, a pivoted weighing beam, means for supporting article receiving means from one end portion of the beam, means for conveying said articles along a predetermined path, article guide means disposed alongside said path and providing an opening through which the articles may pass to drop into said receiving means, a pair of side-by-side gates each movable from an article passing position to an article blocking position within said opening, means for actuating one of said gates to move the same to its article blocking position as the beam reaches a pre-determined position, and means for actuating said other gate to move the same to its article blocking position as the beam moves from said pre-determined position to balanced position, the said gate-actuating means being controlled by movements of said beam.

3. In a filling and weighing machine for handling articles such as citrus fruit, apples, potatoes and the like, a pivoted weighing beam, means for supporting an article receiving means from one end portion of the beam, means for conveying said articles along a predetermined path, article guide means alongside said path providing an opening through which the articles may pass to drop into said receiving means, a pair of side-by-side gates each movable from an out of the way position to an article blocking position within said opening, electrical means for actuating said gates between said out of the way and article blocking positions, a pair of electrical contacts operated successively as the weighing beam rocks to a balanced position, and an electrical circuit connecting said contact means with said electrical actuating means to effect successive operation of said gates from said out of the way to said article blocking position.

FRANK AHLBURG.
ELIJAH H. HUNT.

REFERENCES CITED

The following references are of record in the file of this patent:

UNITED STATES PATENTS

| Number | Name | Date |
|---|---|---|
| 245,628 | Grossnickle | Aug. 16, 1881 |
| 1,899,446 | Smith et al. | Feb. 28, 1933 |
| 2,016,443 | Levitre | Oct. 8, 1935 |
| 2,340,531 | Howard | Feb. 1, 1944 |

FOREIGN PATENTS

| Number | Country | Date |
|---|---|---|
| 634,841 | Germany | Aug. 20, 1936 |